UNITED STATES PATENT OFFICE.

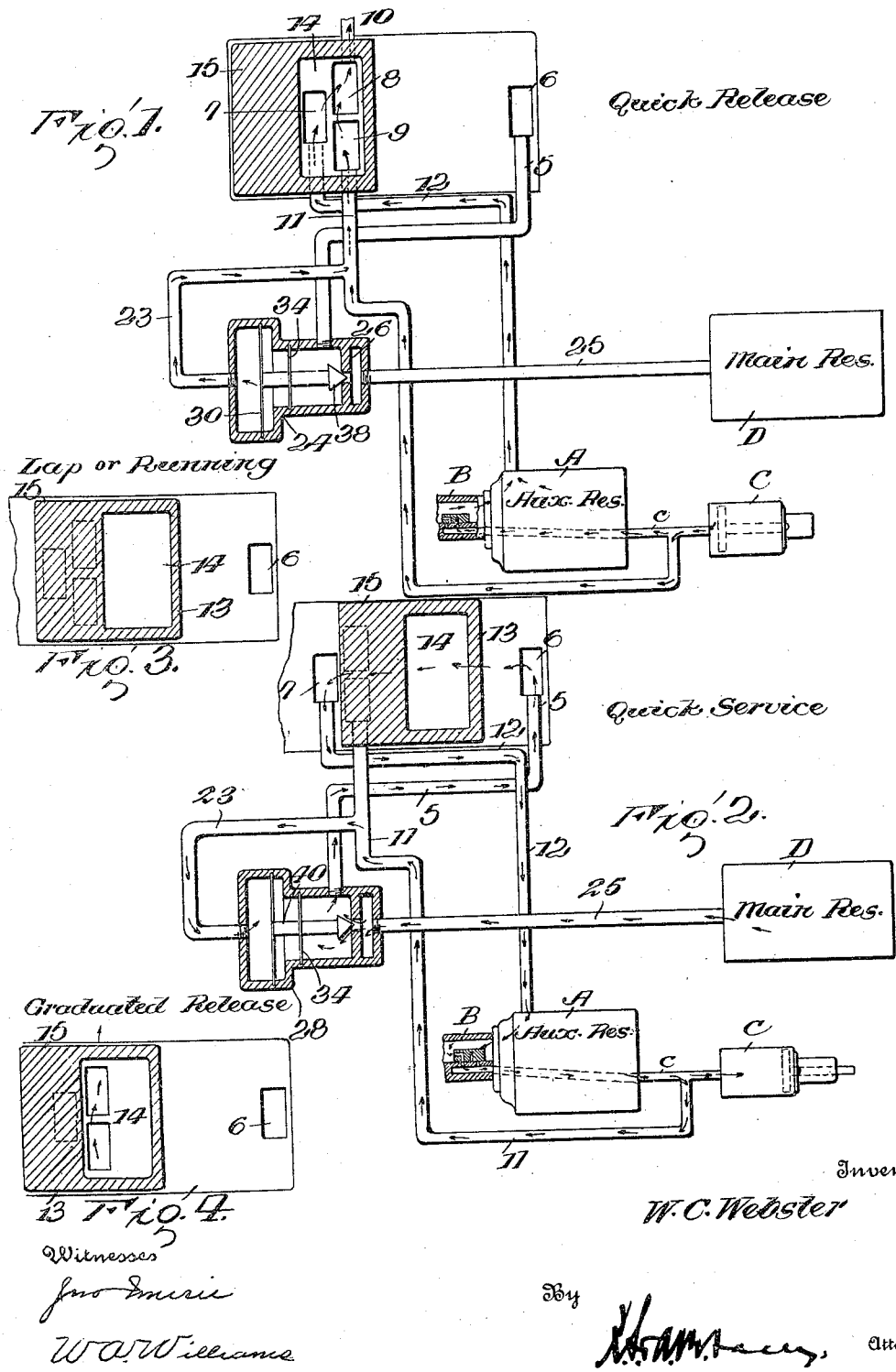

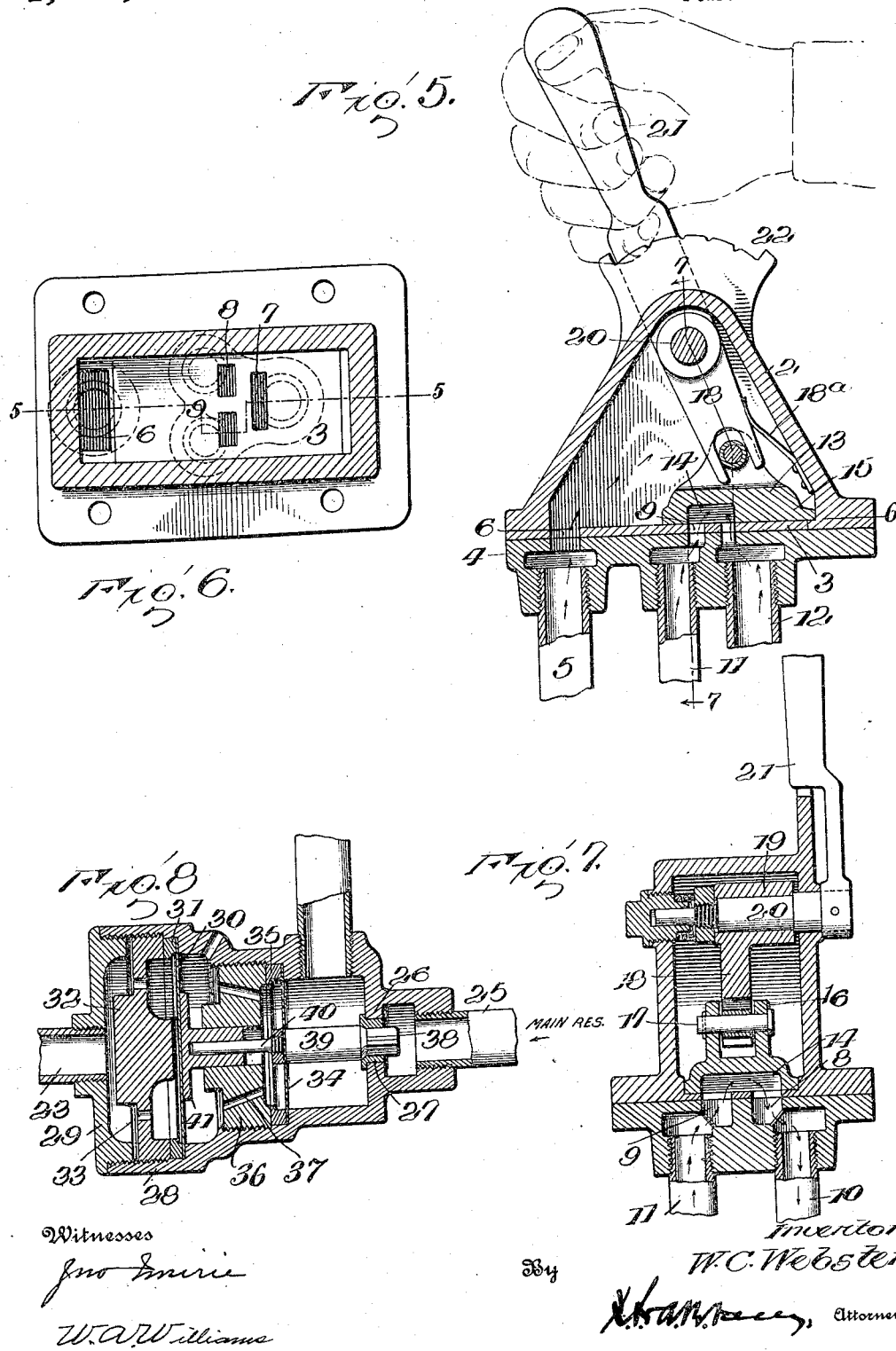

WILLIS C. WEBSTER, OF DUBOIS, PENNSYLVANIA, ASSIGNOR TO BUFFALO AIR-BRAKE COMPANY, OF PHOENIX, ARIZONA, A CORPORATION OF ARIZONA.

STRAIGHT-AIR MECHANISM FOR AIR-BRAKES.

1,244,804.

Specification of Letters Patent.   Patented Oct. 30, 1917.

Application filed May 28, 1914.   Serial No. 841,656.

*To all whom it may concern:*

Be it known that I, WILLIS C. WEBSTER, a citizen of the United States, residing at Dubois, in the county of Clearfield and State of Pennsylvania, have invented certain new and useful Improvements in Straight-Air Mechanism for Air-Brakes, of which the following is a specification.

My invention relates to air brake systems and particularly to means for operating the engine brakes of a train by air from the main reservoir of the air brake system.

The main object of this invention is to provide means whereby the triple valve on the engine may be shifted to service position by use of "straight air" and eliminate the use of check valves or like valves between the straight air mechanism and the triple valve.

Another object of my invention is to provide a straight air system in which the pressure applied to the engine brakes shall be at all times in correspondence with the pressure in the main reservoir and the train pipe so that if the pressure in the main reservoir is increased, the pressure applied to the engine brakes and in the train pipe shall also be increased. In all standard air brake systems pressure applied to the engine brakes by the straight air system is the same at all times, no matter how much the main reservoir and brake pipe pressures are raised above the standard 90 lbs. and 70 lbs., respectively. In other words, if the straight air brake is set with a main reservoir pressure of 90 lbs. and a train line pressure of 70 lbs., the pressure in the engine brake cylinders will be 45 lbs., assuming that the reducing valve has been adjusted to this pressure, and this pressure will always be 45 lbs., no more or no less, even though the main reservoir pressure be raised to 110 lbs. and the train line pressure to 90 lbs. There will be 45 lbs. of pressure upon a straight air application of the engine brakes, though the pressure in the automatic application will vary with the train line pressure. With my construction if pressure is raised in the main reservoir above 90 lbs., the straight air application is also automatically increased in proportion.

A further object of my invention is to provide a straight air brake valve adapted to operate the triple valve on the engine to thereby open the triple valve exhaust port in its quick release position and close the triple valve exhaust port in its service position for reasons which will hereafter more fully appear, and to so design the brake valve as to give either a graduated service application, a quick service application, a graduated release or a quick release.

A further object is to so construct the straight air brake system that it may be operated even when there is no brake pipe pressure so that the straight air may be applied or released at will to operate the triple valve and thereby admit air from the main reservoir to the auxiliary reservoir and brake cylinder, or to exhaust air from auxiliary reservoir and brake cylinder to release the brake.

My invention is illustrated in the accompanying drawings, wherein:

Figure 1 is a diagrammatic view of the elements of my straight air system in quick release position.

Fig. 2 is a like view to Fig. 1 but showing the elements of the system in the quick service position.

Fig. 3 is a diagrammatic view showing the position of the slide valve in running or lap position.

Fig. 4 is a like view showing the position of the slide valve at graduated release.

Fig. 5 is a vertical section through the controlling valve and casing taken on the line 5—5 of Fig. 6.

Fig. 6 is a horizontal section on line 6—6 of Fig. 5.

Fig. 7 is a vertical section on line 7—7 of Fig. 5.

Fig. 8 is a longitudinal diametrical section through the controlling valve.

Corresponding and like parts are referred to in the following description and indicated in all the views of the accompanying drawings by the same reference characters.

Referring to Figs. 5, 6 and 7, 2 indicates the upper part of the valve casing formed with a valve seat 3, the lower part or base of the valve casing being designated 4. At one end of the section 4 is disposed a pipe 5 which opens into the valve casing by means of a port 6, this port extending transversely to the length of the casing. Adjacent the other end of the casing but spaced therefrom is a port 7 which also is transversely extended and which is relatively narrow and disposed adjacent the port 7 but intermediate this port 7 and the port 6 are the transversely alining ports 8 and 9. A pipe 10 enters the base 4 and connects with the port 8 while a pipe 11 enters the base 4 and connects with the port 9.

Entering the base 4 and connecting with the port 7 is a pipe 12. Sliding upon the seat 3 is a slide valve 13 having a cavity 14 in its lower face and a solid portion 15. This slide valve is provided with ears 16 and a pin 17 passing through these ears connects the slide valve with an arm 18 extending radially from a sleeve 19. This sleeve is mounted upon an arbor 20 to which is attached a handle 21. By shifting the handle the slide valve may be shifted from the position shown in Fig. 5 and Fig. 1 to that shown in Fig. 4. The handle operates over a rack 22 whereby the handle may be held in any adjusted position.

The auxiliary reservoir is designated A, is of the usual construction and is connected to any usual or ordinary triple valve B. Preferably the triple valve B is constructed in accordance with the triple valve shown and described in my copending application. Serial No. 841,918 filed on the 28th day of May, 1914, but any ordinary triple valve is adapted to operate with my straight air controlling mechanism. Inasmuch as the construction and operation of triple valves are well known to those skilled in the art, it is not considered necessary to describe or illustrate the details of the triple valve B. The triple valve casing is connected to the brake cylinder C by the usual pipe $c$. The main reservoir is designated D.

The port 7 is connected by pipe 12 to the auxiliary reservoir A, while port 9 is connected by pipe 11 to the pipe $c$. The pipe 10 leads from the port 8 to the atmosphere.

Extending from the pipe 11 is a branch pipe 23 which opens into the governing valve chamber 24. Extending from the other end of this valve chamber is a pipe 25 opening into the main reservoir D. Adjacent the last named end of the chamber 24 is a septum 26 having therein a valve seat 27. The governing chamber is diametrically enlarged at its end opposite the valve seat 27 as at 28 and the adjacent end wall is formed by a cap 29 into which pipe 23 opens. Disposed within this enlarged portion is a diaphragm 30 shown as held in place by a ring 31 and an internal cap 32 having perforations 33, and an extension or boss to limit distortion of the diaphragm 30.

Disposed in the contracted portion of the chamber 24 is a diaphragm 34 which is approximately one-half the size of diaphragm 30. This as shown in Fig. 8 is held in place by a ring 35 and an annulus 36 perforated at 37.

Coacting with the valve seat 27 is a valve 38 which is formed with a stem 39 engaging the diaphragm 34. This stem carries a spindle 40 which engages a head 41 bearing against the diaphragm 30. These diaphragms 34 and 30 are linked together for common movement. From the port 6 of the casing 2 extends the pipe 5 which opens into the chamber 28 at a point midway between the septum 26 and the diaphragm 34.

The operation of the mechanism heretofore described is as follows. In the lap and running position of the valve as shown in Fig. 3, the imperforate portion 15 of the slide valve 13 covers the ports 7, 8 and 9. Hence there is no flow of air to the atmosphere from the auxiliary reservoir and the brake cylinders through either of the ports 7 or 9, and no flow from the main reservoir through the governing chamber 24 and port 9.

Upon a quick service application, the slide valve 13 is shifted to uncover the port 7 as shown in Fig. 2, and air flows from the main reservoir to the auxiliary reservoir by way of pipe 25, chamber 24, pipe 5, port 6, chamber 2, port 7 and pipe 12 moving the triple valve to service position. From the auxiliary reservoir air flows into the brake cylinder by the pipe $c$. As soon as there is 45 lbs. pressure in the brake cylinder (assuming that there is 90 lbs. main reservoir pressure), the back pressure in the pipe 11 and its branch 23 will cause sufficient pressure to be exerted against the diaphragm 30 to close the valve 38 and cut off flow of air to the reservoir auxiliary. At this time the auxiliary reservoir pressure will be 75 lbs. more or less. This is approximately five lbs. greater than the pressure in the train line. After the valve 39 closes, this excess pressure of approximately 5 lbs. will continue to flow to the brake cylinder until the pressure in the auxiliary reservoir is slightly less than in the train line. Then the triple piston valve will move to lap position and close communication between the auxiliary reservoir and the brake cylinder.

The quick service is secured by shifting the valve 13 so as to entirely open the port 7 thus giving a rapid flow of air from the main reservoir to the auxiliary reservoir. To secure a quick release, illustrated diagrammatically in Fig. 1, the valve 13 is shifted so that its cavity 14 connects both of the ports 7 and 9 with the atmosphere by port 8. This connection vents air both from the auxiliary reservoir and brake cylinder and causes the triple valve to return quickly to its normal position (in which position the brake cylinder is connected to the atmosphere through the triple slide valve as usual) and also vents the air behind the diaphragm 30 allowing the valve 38 to open.

In order to secure a graduated service application, the handle 21 is moved to shift W. C. WEBSTER.
STRAIGHT AIR MECHANISM FOR AIR BRAKES.
APPLICATION FILED MAY 28, 1914.
1,244,804.
Patented Oct. 30, 1917.
2 SHEETS—SHEET 2.
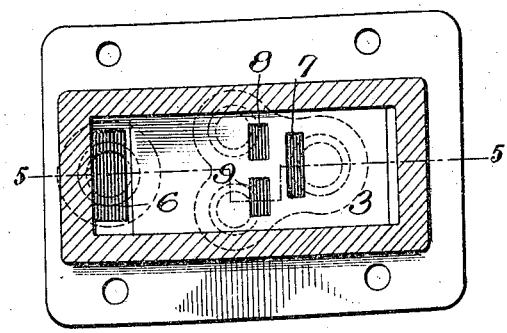
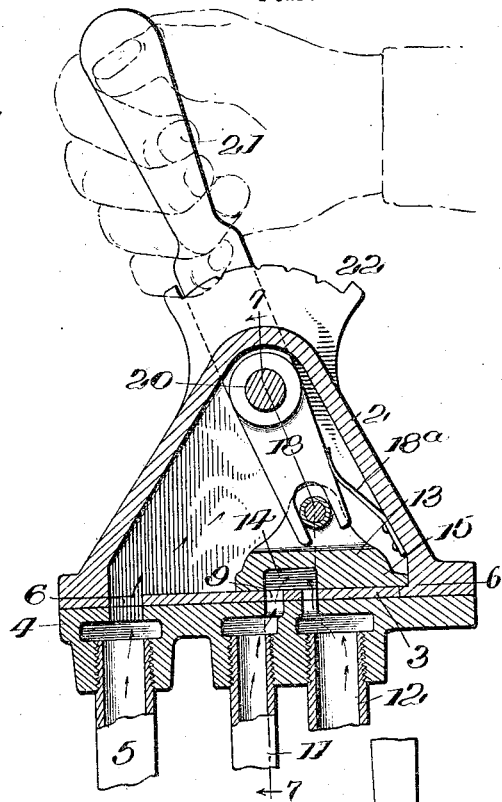
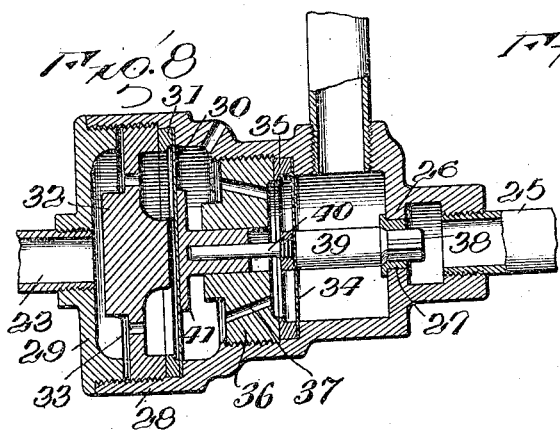
Witnesses
Jno Smirie
W. A. Williams
Inventor
W. C. Webster
By
Attorneys.

To all whom it may concern:

Be it known that I, WILLIS C. WEBSTER, citizen of the United States, residing at Dubois, in the county of Clearfield and State of Pennsylvania, have invented certain new and useful Improvements in Straight-Air Mechanism for Air-Brakes, of which the following is a specification.

My invention relates to air brake systems and particularly to means for operating the engine brakes of a train by air from the main reservoir of the air brake system.

The main object of this invention is to provide means whereby the triple valve on the engine may be shifted to service position by use of "straight air" and eliminate the use of check valves or like valves between the straight air mechanism and the triple valve.

Another object of my invention is to provide a straight air system in which the pressure applied to the engine brakes shall be at all times in correspondence with the pressure in the main reservoir and the train pipe so that if the pressure in the main reservoir is increased, the pressure applied to the engine brakes and in the train pipe shall also be increased. In all standard air brake systems pressure applied to the engine brakes by the straight air system is the same at all times, no matter how much the main reservoir and brake pipe pressures are raised above the standard 90 lbs. and 70 lbs., respectively. In other words, if the straight air brake is set with a main reservoir pressure of 90 lbs. and a train line pressure of 70 lbs., the pressure in the engine brake cylinders will be 45 lbs., assuming that the reducing valve has been adjusted to this pressure, and this pressure will always be 45 lbs., no more or no less, even though the main reservoir pressure be raised to 110 lbs. and the train line pressure to 90 lbs. There will be 45 lbs. of pressure upon a straight air application of the engine brakes, though the pressure in the automatic application will vary with the train line pressure. With my construction if pressure is raised in the main reservoir above 90 lbs., the straight air application is also automatically increased in proportion.

A further object of my invention is to provide a straight air brake valve adapted to operate the triple valve on the engine to thereby open the triple valve exhaust port in its quick release position and close the triple valve exhaust port in its service position for reasons which will hereafter more fully appear, and to so design the brake valve as to give either a graduated service application, a quick service application, a graduated release or a quick release.

A further object is to so construct the straight air brake system that it may be operated even when there is no brake pipe pressure so that the straight air may be applied or released at will to operate the triple valve and thereby admit air from the main reservoir to the auxiliary reservoir and brake cylinder, or to exhaust air from auxiliary reservoir and brake cylinder to release the brake.

My invention is illustrated in the accompanying drawings, wherein:

Figure 1 is a diagrammatic view of the elements of my straight air system in quick release position.

Fig. 2 is a like view to Fig. 1 but showing the elements of the system in the quick service position.

Fig. 3 is a diagrammatic view showing the position of the slide valve in running or lap position.

Fig. 4 is a like view showing the position of the slide valve at graduated release.

Fig. 5 is a vertical section through the controlling valve and casing taken on the line 5—5 of Fig. 6.

Fig. 6 is a horizontal section on line 6—6 of Fig. 5.

Fig. 7 is a vertical section on line 7—7 of Fig. 5.

Fig. 8 is a longitudinal diametrical section through the controlling valve.

Corresponding and like parts are referred to in the following description and indicated in all the views of the accompanying drawings by the same reference characters.

Referring to Figs. 5, 6 and 7, 2 indicates the upper part of the valve casing formed with a valve seat 3, the lower part or base of the valve casing being designated 4. At one end of the section 4 is disposed a pipe 5 which opens into the valve casing by means of a port 6, this port extending transversely to the length of the casing. Adjacent the other end of the casing but spaced therefrom is a port 7 which also is transversely extended and which is relatively narrow and disposed adjacent the port 7 but intermediate this port 7 and the port 6 are the transversely alining ports 8 and 9. A pipe 10 enters the base 4 and connects with the port 8 while a pipe 11 enters the base 4 and connects with the port 9.

Entering the base 4 and connecting with the port 7 is a pipe 12. Sliding upon the seat 3 is a slide valve 13 having a cavity 14 in its lower face and a solid portion 15. This slide valve is provided with ears 16 and a pin 17 passing through these ears connects the slide valve with an arm 18 extending radially from a sleeve 19. This sleeve is mounted upon an arbor 20 to which is attached a handle 21. By shifting the handle the slide valve may be shifted from the position shown in Fig. 5 and Fig. 1 to that shown in Fig. 4. The handle operates over a rack 22 whereby the handle may be held in any adjusted position.

The auxiliary reservoir is designated A, is of the usual construction and is connected to any usual or ordinary triple valve B. Preferably the triple valve B is constructed in accordance with the triple valve shown and described in my copending application. Serial No. 841,918 filed on the 28th day of May, 1914, but any ordinary triple valve is adapted to operate with my straight air controlling mechanism. Inasmuch as the construction and operation of triple valves are well known to those skilled in the art, it is not considered necessary to describe or illustrate the details of the triple valve B. The triple valve casing is connected to the brake cylinder C by the usual pipe c. The main reservoir is designated D.

The port 7 is connected by pipe 12 to the auxiliary reservoir A, while port 9 is connected by pipe 11 to the pipe c. The pipe 10 leads from the port 8 to the atmosphere.

Extending from the pipe 11 is a branch pipe 23 which opens into the governing valve chamber 24. Extending from the other end of this valve chamber is a pipe 25 opening into the main reservoir D. Adjacent the last named end of the chamber 24 is a septum 26 having therein a valve seat 27. The governing chamber is diametrically enlarged at its end opposite the valve seat 27 as at 28 and the adjacent end wall is formed by a cap 29 into which pipe 23 opens. Disposed within this enlarged portion is a diaphragm 30 shown as held in place by a ring 31 and an internal cap 32 having perforations 33, and an extension or boss to limit distortion of the diaphragm 30.

Disposed in the contracted portion of the chamber 24 is a diaphragm 34 which is approximately one-half the size of diaphragm 30. This as shown in Fig. 8 is held in place by a ring 35 and an annulus 36 perforated at 37.

Coacting with the valve seat 27 is a valve 38 which is formed with a stem 39 engaging the diaphragm 34. This stem carries a spindle 40 which engages a head 41 bearing against the diaphragm 30. These diaphragms 34 and 30 are linked together for common movement. From the port 6 of the casing 2 extends the pipe 5 which opens into the chamber 28 at a point midway between the septum 26 and the diaphragm 34.

The operation of the mechanism heretofore described is as follows. In the lap and running position of the valve as shown in Fig. 3, the imperforate portion 15 of the slide valve 13 covers the ports 7, 8 and 9. Hence there is no flow of air to the atmosphere from the auxiliary reservoir and the brake cylinders through either of the ports 7 or 9, and no flow from the main reservoir through the governing chamber 24 and port 9.

Upon a quick service application, the slide valve 13 is shifted to uncover the port 7 as shown in Fig. 2, and air flows from the main reservoir to the auxiliary reservoir by way of pipe 25, chamber 24, pipe 5, port 6, chamber 2, port 7 and pipe 12 moving the triple valve to service position. From the auxiliary reservoir air flows into the brake cylinder by the pipe c. As soon as there is 45 lbs. pressure in the brake cylinder (assuming that there is 90 lbs. main reservoir pressure), the back pressure in the pipe 11 and its branch 23 will cause sufficient pressure to be exerted against the diaphragm 30 to close the valve 38 and cut off flow of air to the reservoir auxiliary. At this time the auxiliary reservoir pressure will be 75 lbs. more or less. This is approximately five lbs. greater than the pressure in the train line. After the valve 39 closes, this excess pressure of approximately 5 lbs. will continue to flow to the brake cylinder until the pressure in the auxiliary reservoir is slightly less than in the train line. Then the triple piston valve will move to lap position and close communication between the auxiliary reservoir and the brake cylinder.

The quick service is secured by shifting the valve 13 so as to entirely open the port 7 thus giving a rapid flow of air from the main reservoir to the auxiliary reservoir. To secure a quick release, illustrated diagrammatically in Fig. 1, the valve 13 is shifted so that its cavity 14 connects both of the ports 7 and 9 with the atmosphere by port 8. This connection vents air both from the auxiliary reservoir and brake cylinder and causes the triple valve to return quickly to its normal position (in which position the brake cylinder is connected to the atmosphere through the triple slide valve as usual) and also vents the air behind the diaphragm 30 allowing the valve 38 to open.

In order to secure a graduated service application, the handle 21 is moved to shift means for establishing communication between the main reservoir and auxiliary reservoir, and automatic means governing such communication, said automatic means acting to maintain a constant pressure in the brake cylinder relative to that in the auxiliary reservoir during service application, the pressure in the auxiliary reservoir being substantially the same as that in the train line.

31. In an air brake, the combination with a main reservoir, auxiliary reservoir, brake cylinder, triple valve and train line, of means for establishing communication between the main reservoir and auxiliary reservoir, and automatic means governing such communication, said automatic means acting to maintain a constant pressure in the brake cylinder relative to that in the auxiliary reservoir during service application, the pressure in the auxiliary reservoir being substantially the same as that in the train line and higher than in the brake cylinder.

In testimony whereof I affix my signature in presence of two witnesses.

WILLIS C. WEBSTER. [L. S.]

Witnesses:
J. K. MOORE,
FREDRIC B. WRIGHT.